(No Model.)
H. H. BINGER.
CLUTCH.
No. 512,148.    Patented Jan. 2, 1894.
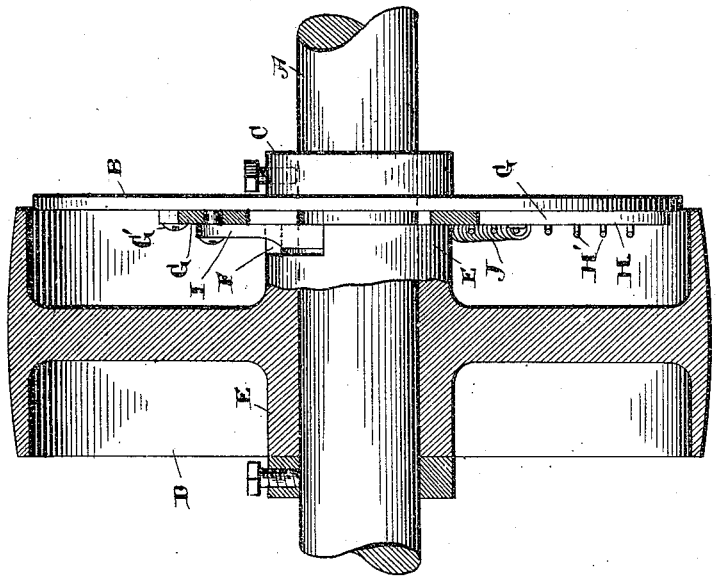
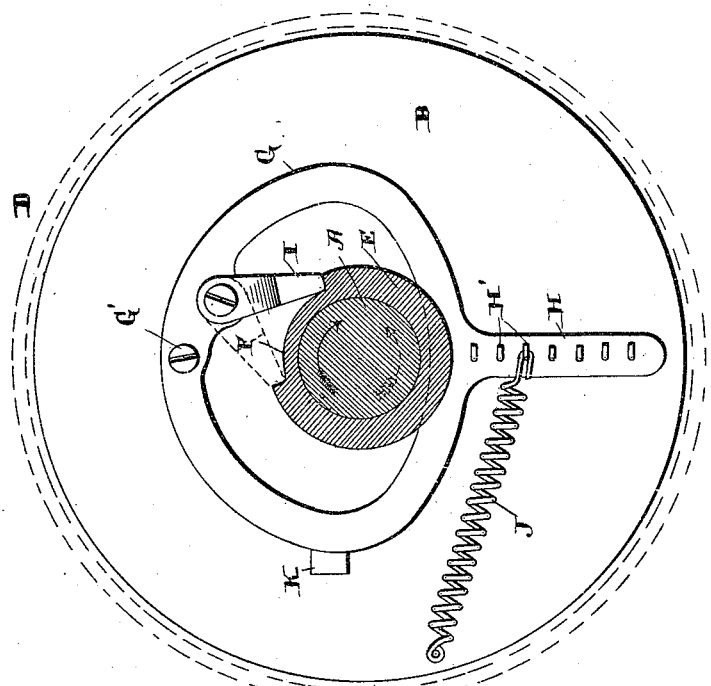
WITNESSES
Geo. E. Frech.
Roland A. Fitzgerald.
INVENTOR
Hermann H. Binger.
By Lehmann Pattison & Nacht attys

UNITED STATES PATENT OFFICE.

HERMANN H. BINGER, OF LA BELLE, MISSOURI.

CLUTCH.

SPECIFICATION forming part of Letters Patent No. 512,148, dated January 2, 1894.

Application filed August 19, 1893. Serial No. 483,506. (No model.)

*To all whom it may concern:*

Be it known that I, HERMANN H. BINGER, of La Belle, in the county of Lewis and State of Missouri, have invented certain new and useful Improvements in Clutches; and I do hereby declare the following to be a full, clear, and exact description of the invention, such as will enable others skilled in the art to which it pertains to make and use it, reference being had to the accompanying drawings, which form part of this specification.

My invention relates to improvements in clutches, and it consists in the novel devices for securing a band or other wheel to a shaft, and will be fully described hereinafter and especially designated in the claims.

The object of my invention is to provide an improved clutch for securing together a wheel and its actuating shaft so that the former will yield or turn upon the latter if subjected to a predetermined strain and if the same continues a complete disengagement will be effected, thus avoiding any possibility of the wheel or pulley being broken.

Referring to the accompanying drawings: Figure 1, is a side elevation of my improved clutch, the shaft and hub of the wheel or pulley being shown in section. Fig. 2, is a longitudinal sectional view of a shaft with the wheel or pulley and clutch mounted thereon.

A is a section of shafting and B a disk mounted thereon having hub C, which is secured permanently to the shaft. Adjacent the disk is wheel or pulley D, having hub E, extended inward toward said disk, and formed in the periphery of the hub is the depression F. Pivoted to the inner side of the disk and encircling the shaft is the recessed plate G, and projecting from one side thereof and in line with the shaft and pivot G', is arm H.

Pivoted to the plate adjacent pivot G', is pawl I, which when turned inward enters the depression F, and thus engages positively the hub of the wheel or pulley loosely mounted upon the shaft. J is a coiled spring secured at one end to the disk and at its opposite end to one of a series of hooks H' on arm H, whereby the plate G is normally so held as to prevent the pawl I from disengaging the hub E when the shaft is revolving in the direction indicated by arrow in Fig. 1. A stop K projects from the disk against which the plate G bears when in its normal position. Thus it will be seen that the wheel or pulley is in positive engagement with the shaft and will so remain until a strain has been exerted thereon sufficient to turn plate G upon its pivot through the medium of the pawl, so as to disengage the latter from the wheel or pulley hub. It is apparent that spring J may be so connected to arm H as to regulate to a nicety the strain which will be sufficient to effect the disengagement of the clutch. If the spring is connected to the arm near its inner end the disengagement will be effected by a much less strain upon the pulley than though the spring is connected to the arm's outer end, and by this means I am enabled to employ the same clutch for either light or heavy machinery.

For driving the wheel in a reverse direction from that indicated by the arrow in Fig. 1, the pawl I is turned to the opposite end of depression F, as shown in dotted lines.

With this form of clutch there is no danger of breaking or over taxing the pulley or band wheel or machinery which may be actuated thereby. The device is adapted for use in connection with either gear or band wheels.

Having thus described my invention, what I claim, and desire to secure by Letters Patent, is—

1. The combination of a shaft, a clutch carrier fixed thereon, a plate pivoted to the carrier at one side of the shaft and having a yielding connection therewith upon the opposite side of the shaft, a wheel or pulley loose on the shaft and a pawl carried by the plate adapted to engage said wheel or pulley, substantially as shown and described.

2. An improved clutch comprising a shaft, a clutch carrier fixed thereon, a plate pivoted at one side to the carrier, an adjustable yielding connection between the carrier and the opposite side of the plate, a pawl carried by the plate and a wheel or pulley loose upon the shaft which is adapted to be engaged by the pawl, substantially as described.

3. The combination of a shaft, a clutch carrier fixed thereon, a plate pivoted at one side to the carrier, an arm projecting from the opposite side of the plate, a spring secured at one end to the carrier and its opposite end adjustably secured to said arm, a pawl carried by the plate and a wheel or pulley loose upon the shaft which is engaged by said pawl, substantially as shown and described.

4. The combination of a shaft, a clutch carrier fixed thereon, a recessed plate encircling the shaft and pivoted at one side to the carrier, a yielding connection between the opposite side of the plate and the carrier, a pawl carried by the plate and a wheel or pulley loose on the shaft adapted to be engaged by the pawl, substantially as shown and described.

5. The combination of a shaft, a clutch carrier fixed thereon, a recessed plate encircling the shaft and pivoted at one side to the carrier, a stop projecting from the carrier, a yielding connection between the free end of the plate and the carrier which holds the former normally against said stop, a pawl carried by the plate and a wheel or pulley loose on the shaft which the said pawl engages, substantially as shown and described.

6. The combination of a shaft, a clutch carrier fixed thereon, a plate having a pivotal and a yielding connection with the carrier upon opposite sides of the shaft, a pawl carried by the plate, a wheel or pulley and a hub therefor having a depression in its periphery which the said pawl engages, substantially as shown and described.

In testimony whereof I affix my signature in presence of two witnesses.

HERMANN H. BINGER.

Witnesses:
ANDREW FISHER,
SMITH FULLER.